Nov. 6, 1962   L. F. GRANDEL   3,062,944
HAND TOOL FOR FORMING PLASTIC TUBING
Filed Dec. 19, 1960   2 Sheets-Sheet 1
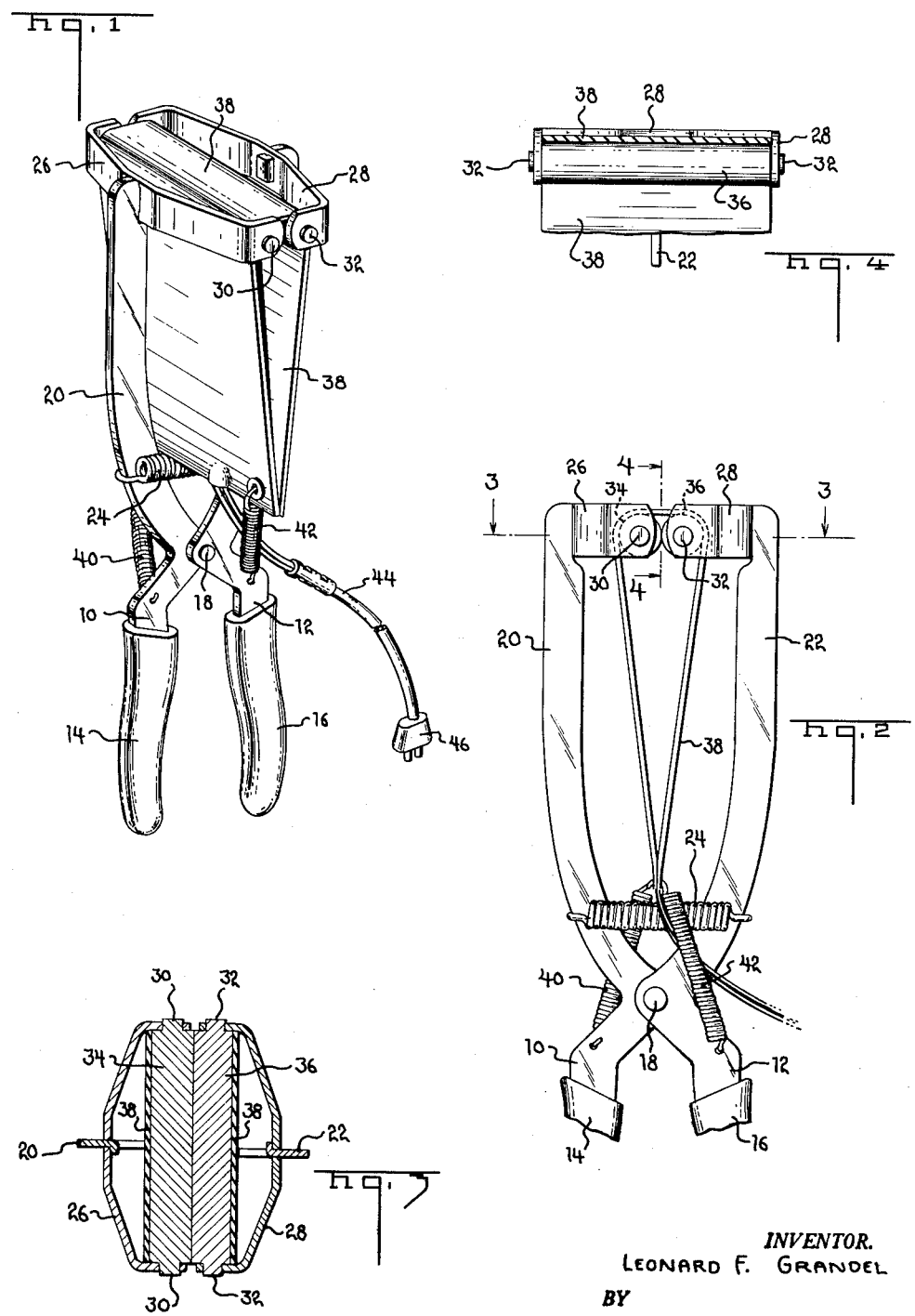
INVENTOR.
LEONARD F. GRANDEL
BY
Curtis, Morris & Safford Nov. 6, 1962  L. F. GRANDEL  3,062,944
HAND TOOL FOR FORMING PLASTIC TUBING
Filed Dec. 19, 1960  2 Sheets-Sheet 2
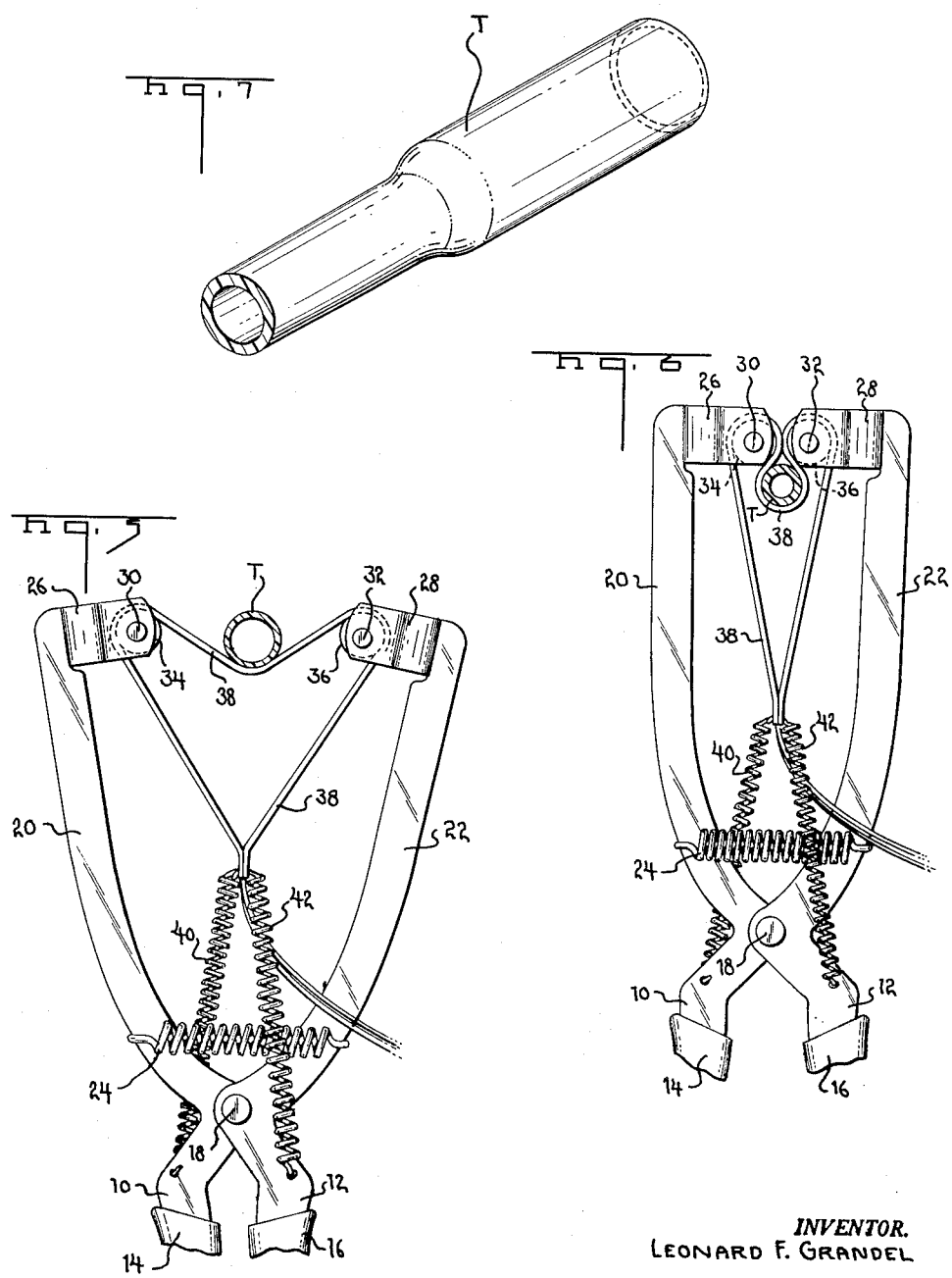
INVENTOR.
LEONARD F. GRANDEL
BY

United States Patent Office 3,062,944
Patented Nov. 6, 1962

3,062,944
HAND TOOL FOR FORMING PLASTIC TUBING
Leonard F. Grandel, Hershey, Pa., assignor to AMP Incorporated, Harrisburg, Pa.
Filed Dec. 19, 1960, Ser. No. 76,838
2 Claims. (Cl. 219—21)

A useful form of insulating plastic includes tubing which has been expanded or 'sized" by heating it to increase its diameter and mechanically holding it in the expanded condition while cooling it. The plastic, when heated again, tends to shrink back to its original size. This sized tubing is particularly useful for insulating electrical connections. The expanded tubing is placed over the connection and heated so that when it constricts to its original size, it tightly embraces the connection and forms an insulating seal.

It is an object of this invention to provide a device for heating the expanded tubing to cause it to shrink. It is also an object of this invention to provide a tool which may be quickly and easily slipped over the tubing to cause the tubing to be slightly heated and permitted to return to its original size. Furthermore, the device of this invention is simple and compact so that it may be used on a piece of tubing which is placed over an electrical connection without damage to surrounding elements.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:
FIGURE 1 is a perspective view of a device embodying the principles of this invention;
FIGURE 2 is a side view of the device of FIGURE 1;
FIGURE 3 is a view taken through plane 3—3 of FIGURE 2;
FIGURE 4 is a view taken through plane 4—4 of FIGURE 2;
FIGURE 5 is a view of the tool in open position showing a piece of plastic tubing placed therein;
FIGURE 6 shows the tool of FIGURE 5 after the plastic has been shrunk down to its new size; and
FIGURE 7 shows a piece of plastic tubing with one end in its expanded condition and the other end shrunk down to its original condition.

As shown in FIGURES 1 and 2, the device comprises a pair of handles 10 and 12 covered with insulation 14 and 16. These handles are commonly pivoted by pivot pin 18, and each handle has a blade or arm 20 and 22 extending therefrom. A spring 24 engages the arms 20 and 22 to normally hold them in closed position.

As seen in FIGURE 1, each arm has a yoke 26 and 28 at its free end. Each yoke has a pivot pin 30, 32 extending between the ends of the yoke to support a pair of rollers 34 and 36 respectively. A roll of rubberized insulating material 38 having a heating element embedded therein (not shown) is disposed about the rollers 34 and 36. One end of the roll 38 is stretched toward the pivot pin 18 by spring members 40 and 42 secured to the handles 10 and 12 respectively. As shown in FIGURE 2, the springs 40, 42 take up the slack in the roll 38. An electrical cord 44 having a plug 46 thereon is conductively secured to the heating elements in the roll 38.

When it is desired to shrink the tubing T, the plug 46 of the device is inserted into an electrical outlet. This energizes the heating element and causes the roll of material 38 to become somewhat warm. The handles are squeezed together so that the arms 20 and 22 move from the closed position shown in FIGURE 2 to the open position shown in FIGURE 5. When the arms are open, the roll is tightly stretched between the rollers 34, 36 and the springs 40 and 42 are extended. The tubing T is positioned between the arms against the roll and the handles 14 and 16 are permitted to close. As shown in FIGURE 6, the roll 38 completely surrounds the tubing T so that heat is distributed evenly to its periphery. The spring members 40, 42 retain this insulating roll in tight contact with the tubing. Thus, the warmth emanating from the roll is distributed to the tubing and the tubing is permitted to shrink to its original size. As the tubing shrinks, the spring members continue to take up the slack so that the roll 38 is always held in close contact with the tubing.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:
1. A device for sizing plastic tubing comprising a pair of handles, said handles commonly pivoted for motion toward or away from each other, a pair of arms extending from said handles, a heating unit comprising an endless roll of insulation material having heating means embedded therein, a roller on each of said arms, said heating unit disposed about said rollers, means resiliently holding the insulating material taut, and means for securing the heating means to an energizing source.
2. A device for shrinking plastic tubing comprising a pair of arms, a roller on each of said arms, an endless roll of flexible insulating material disposed on said rollers, a heating element embedded in the insulating material, means for moving said arms toward and away from each other, means for securing said heating element to a source of power, and spring means for holding said insulating material taut when the arms are closed but permitting the arms to be opened and the material to be deformed by placing a piece of plastic tubing therebetween.

References Cited in the file of this patent
UNITED STATES PATENTS
821,361     Hitner _____ May 22, 1906
FOREIGN PATENTS
524,530     Great Britain _____ Aug. 8, 1940